Figure 1:
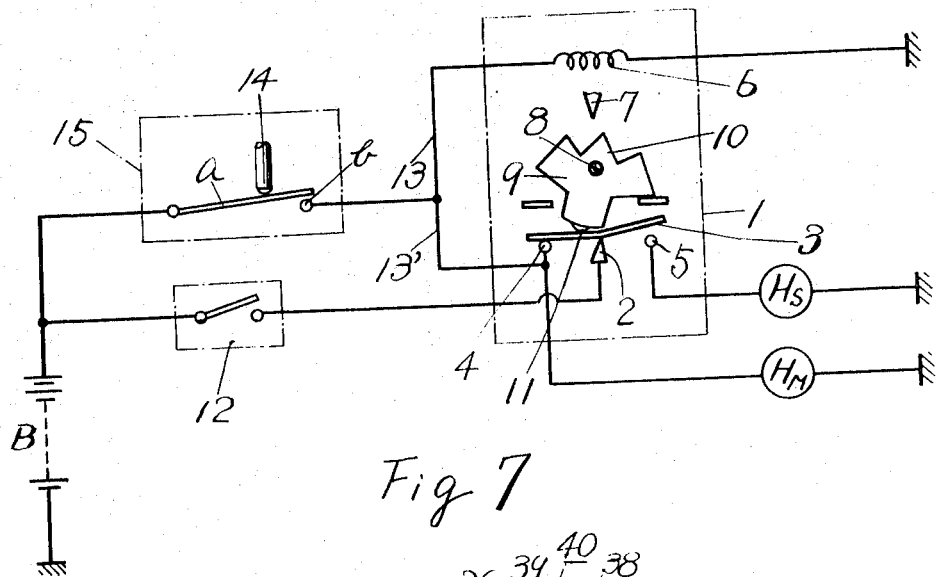

United States Patent

Suzuki

[15] 3,648,101
[45] Mar. 7, 1972

[54] PASSING SIGNALS FOR AUTOMOBILES

[72] Inventor: Masaru Suzuki, Aichi-ken, Japan

[73] Assignee: Kabushiki-Kaisha Tokai Denki Seisakushe, Aichi-ken, Japan

[22] Filed: Jan. 12, 1970

[21] Appl. No.: 2,003

[30] Foreign Application Priority Data

Jan. 24, 1969 Japan................................44/6229
Jan. 25, 1969 Japan................................44/6540

[52] U.S. Cl..................................315/82, 315/83, 340/76
[51] Int. Cl..........................................B60g 1/46
[58] Field of Search..............................315/82, 83

[56] References Cited

UNITED STATES PATENTS

| 3,139,555 | 6/1964 | Paule et al. | 315/82 |
| 1,774,101 | 8/1930 | Lorimer | 315/82 |
| 1,657,816 | 1/1928 | Bonner | 315/82 |
| 2,769,938 | 11/1956 | Pauly | 315/83 X |
| 3,302,057 | 1/1967 | Siiberg | 315/83 X |
| 3,008,121 | 11/1961 | Ellithorpe | 315/82 X |
| 3,325,681 | 6/1967 | Swensen | 315/83 |
| 2,822,505 | 2/1958 | Wilfert | 315/83 X |

Primary Examiner—Herman Karl Saalbach
Assistant Examiner—Saxfield Chatmon, Jr.
Attorney—Shlesinger, Fitzsimmons & Shlesinger

[57] ABSTRACT

The usual high-beam and low-beam headlights of an automotive vehicle are wired in circuit to be controlled by a pulsing rod to effect flash signals. At night a main switch is closed to illuminate both high-beam and low-beam headlights and to incorporate them in a pulsing circuit controlled by the reciprocable pulsing rod and a rocker member to flash the lights off and on by reciprocation of the rod. During the day the main switch is opened but through a branch circuit, reciprocation of the pulsing rod causes rocking of the rocker member to flash the high-beam headlight only.

6 Claims, 7 Drawing Figures

INVENTOR.
Masaru Suzuki

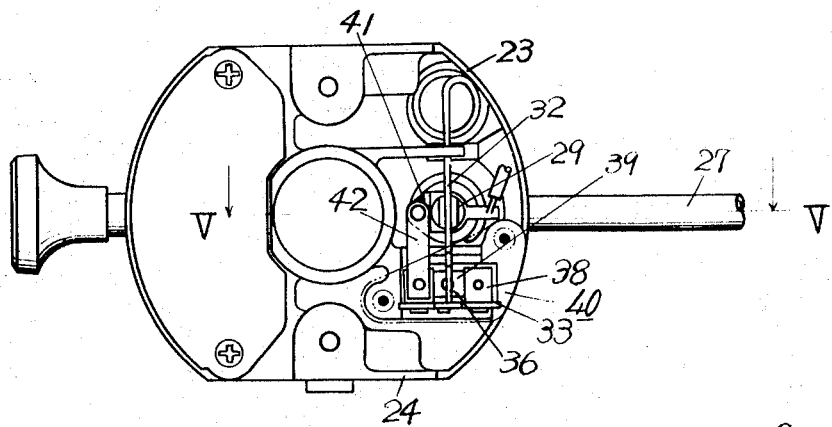
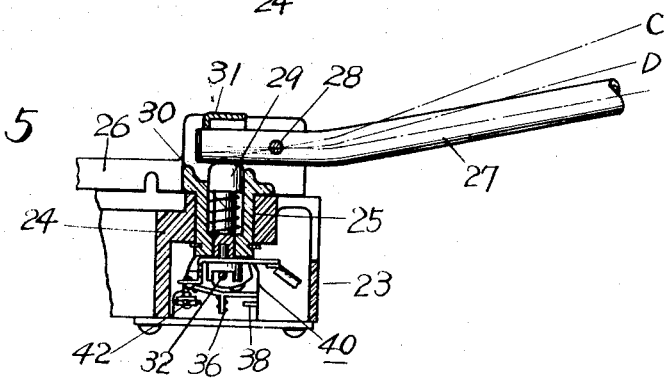
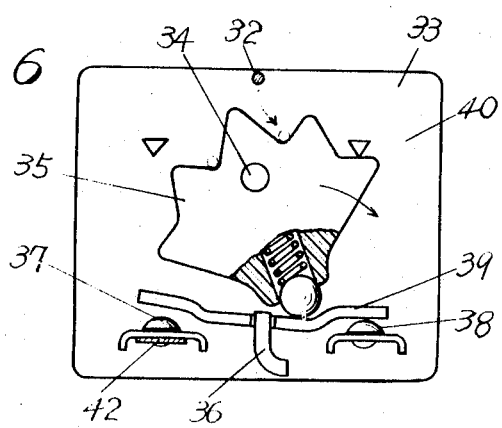

PASSING SIGNALS FOR AUTOMOBILES

This invention relates to passing signals for automobiles.

Various kind of passing signals for automobiles are known, an example of such headlight control arrangement being disclosed in U.S. Pat. No. 3,135,893. However, in such conventional headlight control arrangements, at least a pair of pulse switches are required to make the headlight intermittently when said headlight is utilized as a passing signal both in daytime and by night.

In view of the disadvantages of conventional passing signal systems, it is a principal object of the present invention to provide a passing signal system in which a single pulse switch which is operable, manually or by foot, for instance, can give passing signals notwithstanding whether the headlight is turned on at night or put off in daytime.

Figure 7:
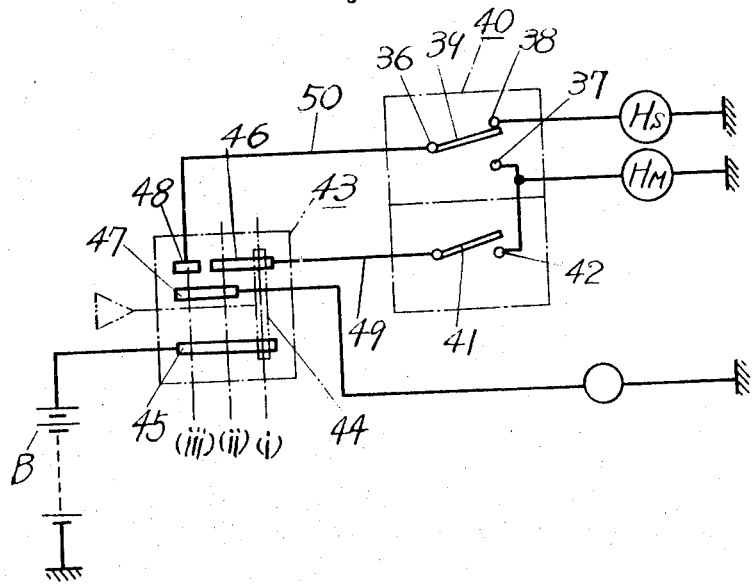
Figure 2:
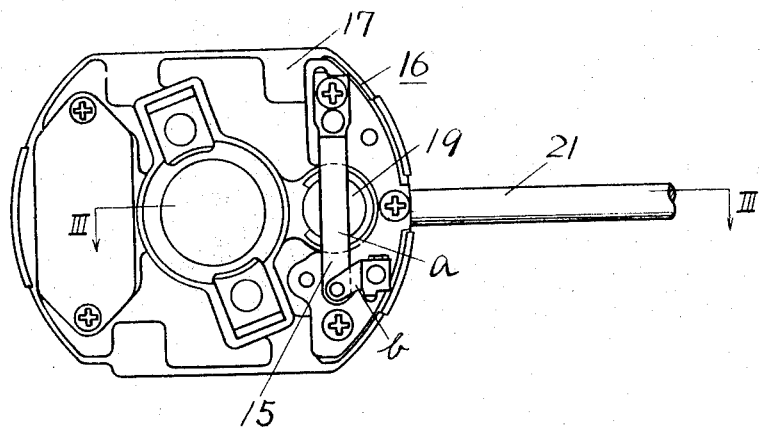
Figure 3:
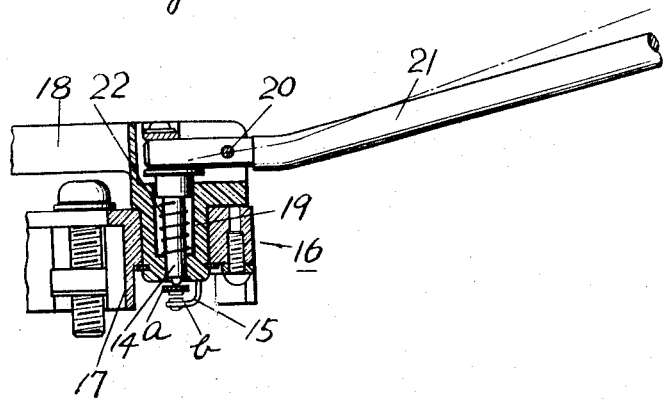

In the drawing which illustrates two preferred embodiments of the present invention;

FIG. 1 shows a schematic view of the first embodiment showing the wiring connections thereof, FIG. 2 is a plan view of the first embodiment assembled into a turning indicating apparatus, FIG. 3 is a fragmentary cross-sectional view of FIG. 2 taken on the line III—III of FIG. 2, FIG. 4 is a plan view of the second embodiment of the present invention passing signals assembled into another turning signal indicating apparatus, FIG. 5 is a fragmentary cross sectional view of FIG. 4 taken along the line V—V, FIG. 6 is an enlarged explanatory view of the control member of the second embodiment, and FIG. 7 is a schematic wiring diagram of the second embodiment of the present invention.

In the first embodiment illustrated in FIGS. 1 to 3, a control member 1 comprises a tiltable movable contact 3 supported by a fulcrum 2 at its center to assume either a position in contact with a stationary output contact 4 which connects to a main headlight Hm or a position to contact with another stationary output contact 5 which connects to a subsidiary headlight Hs. Said fulcrum 2 serves as an input contact electrically connecting the tiltable movable contact 3 to an electric source B through a main switch 12 when said switch is closed.

Said tiltable movable contact 3 assumes one of the aforementioned positions by the movement of a mechanical control plate 9 about a pivot 8. Said mechanical control plate 9 is provided at its one end facing to the tiltable movable contact 3 with a steel ball which resiliently and slidably contacts with the contact 3 to press said movable contact either to the position where it contacts with the stationary output contact 4 or the position where it contacts with the other stationary output contact 5. In the other end of the mechanical control plate 9 which is opposite to the aforementioned end, there are provided two tapered notches 8. The movement of said mechanical control 9 is performed by the engagement of either one of the tapered notches 8 with an actuating piece 7 which moves upon energization of a relay coil 6. The input terminal of relay coil 6, which is one of constituent parts of the control member 1, is connected through a pulse switch member 15 to the electric source such as a battery B. Said pulse switch member 15 comprises a normally opened contact plate $a$, a push rod 14 and a stationary contact $b$ which comes into contact with the contact plate $a$ by the manual operation of the push rod 14 and closes the line 13. Said stationary contact $b$ connects to the main headlight Hm by a line 13' which is parallel with the line 13 and makes a passing signal circuit when the main switch 12 is not closed when an automobile is driven in the daytime.

A passing signal having the above-described constructions can readily be assembled into a direction signal device indicating apparatus of any conventional type. An example of the present invention passing signal assembled into a direction signal indicating apparatus is shown in FIGS. 2 and 3.

Numeral 17 indicates a body 17 of the direction signal indicating apparatus having a vertical tubular portion 19 and a bracket 18 horizontally movable about said tubular axis by the operation of a lever 21 for indicating turning directions. Said lever 21 is manually operable in horizontal directions, and as well as being operable in a vertical direction about a pivotal axis 20, viz, to the position illustrated by chain lines in FIG. 3. The push rod 14 is mounted inside the tubular portion 19 coaxially thereto and urged normally towards the lever 21 so as to abut at its upper end against said lever, by means of a coil spring 22. The pulse switch 15 thus arranged will have its contact $b$ open unless the push rod 14 is pressed by the lever 21 raised to the position shown by the chain lines in FIG. 2.

In the above embodiment of the present invention, when the main switch 12 is kept open in daytime, viz, neither the main nor the subsidiary headlight is put on; but by the manual depressing and releasing operation of the push rod 14 by the lever 21, the passing signal circuit 13' becomes intermittently closed and open, resulting in intermittently energizing the main headlight Hm and thus making known the driver's intention.

Simultaneously with the above operation, the relay coil is energized and mechanical control plate 9 operates as a consequence, but the subsidiary headlight Hs does not emit and the main headlight Hm solely intermittently is illuminated, because of the fulcrum 2 being not supplied with electric current.

When the main switch 12 is kept closed at night, the illumination of the main and subsidiary headlights is done alternatively by means of the control member 1 in accordance with the actuation of the pulse switch member 15 in the same manner as in the conventional dimmers for automobiles, since the main headlight Hm is put on and off by the pulsation of current flown in the line 13' and in alignment with the intermittent illumination of the main headlight, the subsidiary headlight Ms becomes illuminated by the energization of relay coil 6.

In the second embodiment of passing signals for automobiles in accordance with the present invention illustrated in FIGS. 4 to 7, there is shown a passing signal assembled into one of conventional direction signal indicating apparatus such as disclosed and illustrated in Japanese Utility Model Publication No. 43–4085, which has a working principle identical to the first embodiment described and shown in the above in connection with FIGS. 1 to 3 and in which a single pulse switch member serves to operate passing signals notwithstanding whether a main and subsidiary headlight are turned on by closing a main switch at night or they are turned off by opening the main switch by daytime by means of the novel provision of connecting an electric source to the main and subsidiary headlights through the pulse switch member and a control member which alternatively illuminates one of the headlights by the repeated actuation of the pulse switch member when the main switch is closed by night and at the same time connecting the electric source in parallel solely to the main headlight through the pulse switch member which intermittently illuminates said main headlight by the repeated depressing and releasing operation of said switch member even when the main switch is kept open by daytime.

Numeral 23 indicates a direction signal indicating apparatus having a body 24 provided with a tubular portion 25 which extends vertically to said body 24. A movable bracket 26 is pivoted about the axis of said tubular portion 25 and horizontally movable to a desired turning indicating position by the operation of a lever 27. The lever 27 is horizontally movable and as well vertically movable about a pivotal axis 28 to either one of positions $c$ and $d$ as indicated by chain lines in FIG. 5. Inside the tubular portion 25, there is provided a push rod 29 which is movable inside the tubular axis along the axial direction thereof and normally urged towards the lever by means of a coil spring 30. Numeral 31 indicates a stopper plate which limits the downward movement of the lever 27 by the push rod 29 which is urged by the coil compression spring 30 upwardly in FIG. 5.

As best shown in FIG. 4, there is provided a resilient rod 32 which extends inside the body 23 so that its free end abuts the push rod 29 with its opposite end opposite engaging the lever 27. The push rod 29 thus arranged corresponds to the pulse switch member 15 in the first embodiment shown in FIGS. 1 to 4. Said resilient rod 32, which corresponds in function to the actuating piece 7 which constitutes a component part of the control member 1 in the first embodiment of the present invention passing signals, comes into engagement, by operation of push rod 29 through the lever 27, with one of two tapered notches provided in a mechanical control plate 35. The mechanical control plate is swingably supported by a pivot 34 on an insulated plate 40. On the other end of the mechanical control plate 35 which is opposite to the tapered notches, there is provided a steel ball which resiliently presses a movable contact plate 39. The contact plate 39 supported by a stationary contact terminal 36 at its center as a fulcrum can assume either a position where it engages a stationary contact 38 connecting to a subsidiary headlight Hs as illustrated in FIG. 6, or a position where it engages another stationary contact 37 connecting to a main headlight Hm.

In the above construction, when the lever 27 is manually raised to the position denoted by the letter c in FIG. 5, the push rod 29 is pressed downwardly against the resilient force of the coil spring 30 which normally urges the rod 29 upwardly. The lower end of the push rod 29, as a consequence of the downward movement of the latter, presses the resilient rod 32 to make it engage one of the tapered notches of the mechanical control plate 35, resulting in making the movable contact plate 39 swing about the terminal 36 as its center. The headlights Hm and Hs are, hence, alternatively illuminated by the manual operation of the lever 27.

To the lower end of the push rod 29, there is fitted a resilient movable contact plate 41 which can contact with the stationary contact 42 connected to the main headlight Hm, when the lever 27 is manually raised to the position shown by the letter D in FIG. 5.

In FIG. 7 which shows electrical connections of the passing signal system having the above construction, numeral 43 indicates a combination switch having a movable contact 44 which connects a passing signal terminal 46 to an electric terminal 45 connected to an electric source B when it is moved to the position indicated by (i) which connects a front light terminal 47 to the terminal 45 at the position (ii) and connects the said front light terminal and dimmer switch electric terminal 48 to the terminal 45 at the position (iii).

Said resilient movable contact plate 41 connects with the passing signal terminal 46 by a conductor 49 and hence with the electric source such as a battery B. The input terminal 36 of the movable contact plate 39 of the control member 40 connects with the dimmer switch terminal 48 through a conductor 50 and hence to the electric source B.

In the constructions and electric connections described as above, when the movable contact 44 of combination switch 43 is placed at (i) at daytime or at the location (ii) at dusk, the manual raising and releasing operation of lever 27 which is accompanied with the up and downward movement of push rod 29 causes the repeated and intermittent contact of the resilient movable contact plate 41 with the fixed contact 42. In consequence of this, the current flowing through the conductor 49 which connects said contact plate 41 and the electric source B is intermittently cut off, resulting in intermittently illuminating the main headlight Hm and letting know the intention of passing. The lever 27 is raised to the uppermost vertical position C to effect the operation; when raised only up to the position D, the mechanical control plate 35 does not operate at all.

When driving at night, the passing signal solely by means of the intermittent illumination of the main headlight Hm does not occur, but could be made by the alternative illumination of the main and subsidiary headlights Hm and Hs by the operation of the control member 40, because the combination switch 43 is set to the position where the movable contact thereof is located to the position (iii) and the current does not flow through the conductor 49.

As readily be understood, in the present invention passing signals for automobiles are described with reference to FIGS. 1 to 7 illustrating two preferred embodiments of the present invention; a single pulse switch 15 in the first embodiment and the switch indicated by 41 which coacts with the other members of the control member 40 in the second embodiment, both work to indicate passing signals whether automobiles are driven by daytime or by night, thereby eliminating a plurality of switches for changing over the passing signal circuit by daytime and by night.

What is claimed is:

1. A passing signal system for automotive vehicles, which have a main headlight and a subordinate headlight, comprising
    an electrical power source,
    a movable main switch connected to said source,
    a second switch in circuit with said main switch and movable between first and second positions alternately to connect said main and said subordinate headlights, respectively, to said power supply only when said main switch is in a first position,
    a third, normally open switch interposed between said source and said main headlight and operable, when closed, to energize said main headlight from said source independently of said second switch, and
    means including an actuator movable in opposite directions and operative each time said actuator is moved in one direction to close said third switch and to move said second switch from one to the other of its two positions.

2. A passing signal system as defined in claim 1, wherein said means further includes
    a bistable control member connected to said second switch and movable between first and second positions in which it urges said second switch to its first and second positions, respectively,
    an electric coil in circuit with said third switch to be energized from said source each time said third switch is closed, and
    an armature controlled by said coil to move said control member from one to the other of its positions each time said coil is energized.

3. A passing signal system as defined in claim 1, wherein said means further includes
    a bistable control member connected to said second switch and movable between first and second positions in which it urges said second switch to its first and second positions, respectively,
    a plunger reciprocable by said actuator and operably connected to said control member to move the latter from one to the other of its two positions each time said actuator is moved in opposite directions.

4. A passing signal system as defined in claim 3, including
    means operative to close said third switch each time said plunger is moved a first distance in said one direction, and
    means operative to move said control member from one to the other of its positions each time said plunger is moved beyond said first distance in said one direction.

5. A passing signal system as defined in claim 1, wherein said main switch is connected at one side to said source and at its opposite side to said second switch, and
    said third switch is connected at one side to said source and at its opposite side to said main headlight.

6. A passing signal system as defined in claim 1, wherein said main switch is movable between first and second positions in each of which it connects one only of said second and third switches to said power source.

* * * * *